Jan. 27, 1959 — S. P. WINTHER — 2,870,733
CLEAT
Filed Oct. 7, 1957
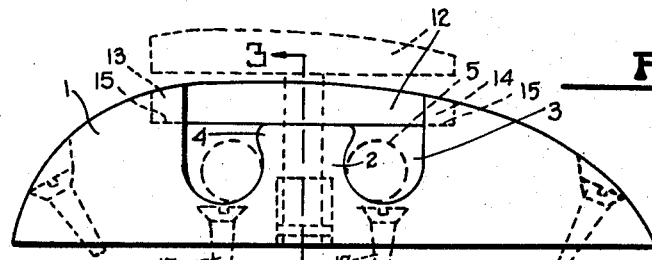
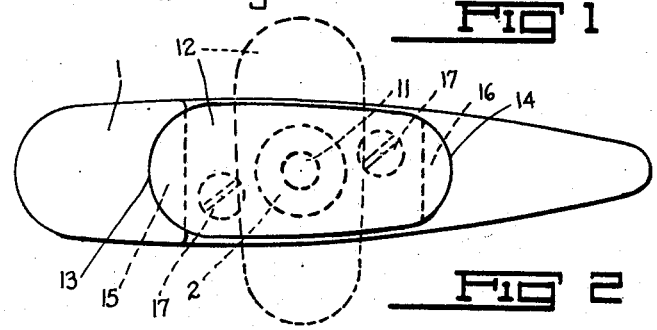
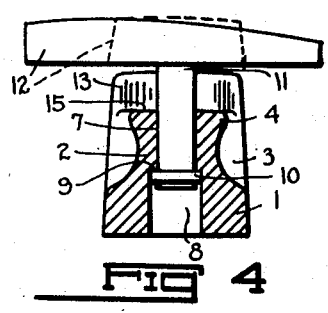
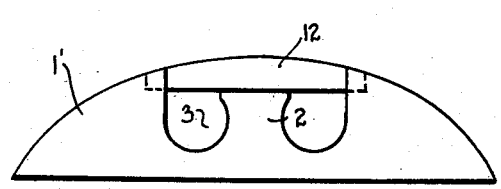
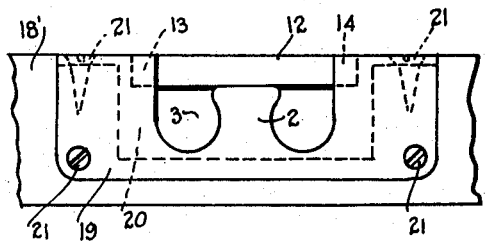
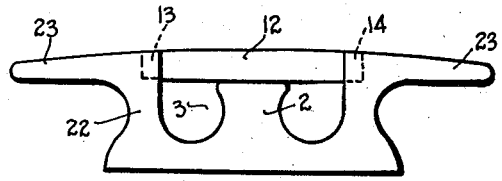
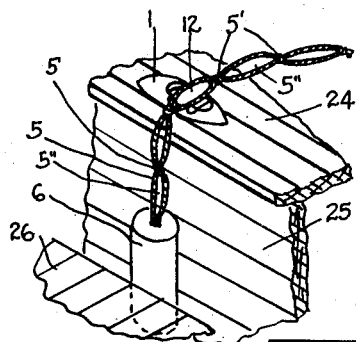
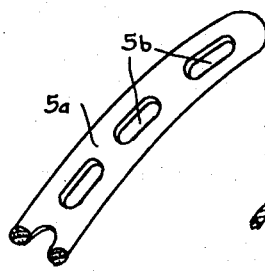
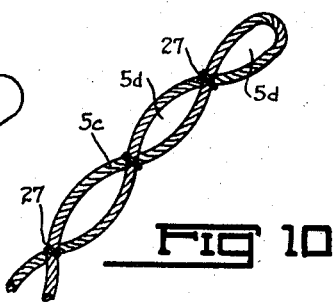
INVENTOR.
SIMON P. WINTHER
BY Charles Richard Werner
ATTORNEY

United States Patent Office 2,870,733
Patented Jan. 27, 1959

2,870,733

CLEAT

Simon P. Winther, Chicago, Ill.

Application October 7, 1957, Serial No. 688,508

10 Claims. (Cl. 114—218)

This invention relates in general to cleats for marine craft and the like, and in particular to a cleat for use with a looped line for supporting fenders.

Present day cleats and their use have a number of disadvantages. First; in order to secure the line carrying a fender to the cleat, the line must be so fastened that it will not come loose. Therefore, as the tide rises and falls and the fender position requires changing, the line must be loosened and retied in order to keep the fender in a protective position. This is a time consuming procedure, particularly when there are several fenders in use. When lines are wet and become taut they are quite difficult to untie from the cleat.

Second; the cleats, because of their peculiar horned shape, are extremely dangerous on shipboard and are a contributing cause of many injuries to personnel and damage to equipment such as sails and the like.

Third; various lines, fuel or gas hose, power lines, etc., are quite often snagged on the horn cleats during their manipulation on deck.

To eliminate the above disadvantages it is the primary object of my invention to provide a cleat for shipboard use in which the conventional horns are eliminated.

It is another object of my invention to be used in combination with a looped line which will not require tying but can be quickly and easily applied and removed from the cleat.

One more object of my invention is to provide a streamlined cleat with a central post to receive the looped line, and a line securing bar for preventing removal of the line and to complete the streamlining of the cleat.

It is still another object of my invention to provide a streamlined cleat with a central post and a securing bar or locking plate mounted on the post for vertical movement, and recesses in the cleat body receiving the ends of the securing bar when in locking position.

And one more object is to employ my invention in cleats of symmetrical curved shape, in a flush type mounting type for use in the bulwark or coaming on a craft, or in a horned cleat when such horns are necessary for other than the securing of fender lines.

And another object of my invention is to provide fender lines for use with my cleat, said lines taking any one of several different forms all provided with loops which can be quickly and easily applied to and removed from a central post in my cleat.

Other objects and advantages as well as the construction and use of my invention in its various forms will be better understood by reference to the following description in connection with the accompanying drawing in which:

Fig. 1 is a side elevational view of my cleat with the raised position of the pivotal locking plate shown in dotted lines.

Fig. 2 is a top view of the same with dotted lines showing the pivotal locking plate in 90° open position.

Fig. 3 is a vertical cross sectional view on the line 3—3 of Fig. 1, parts being shown in elevation.

Fig. 4 is a similar view with the locking plate raised and in 90° pivoted position.

Fig. 5 is a reduced side elevational view of a modified form of cleat showing a full streamlined or symmetrical curved design.

Fig. 6 is a reduced side elevational view of another modified form of cleat showing a cleat housing mortised into the bulwark or coaming of a craft.

Fig. 7 illustrates a further modified design of my invention which is incorporated with the horned cleat design commonly in use.

Fig. 8 is a fragmentary isometric view showing my invention in use with the fender and fender line in the process of being dropped over the lock plate.

Fig. 9 is a fragmentary isometric view of a belt with spaced apertures which can be used as a fender line with my cleat.

Fig. 10 is a similar view of a further modified form of fender line for use with my invention.

Referring now to the drawing by numerals of reference, 1 designates the streamlined body of my cleat having a central post 2 located in a central aperture 3, the post 2 being provided with an enlarged crown portion 4 for retention of the line 5 which may be for holding a fender 6 or for any other suitable purpose on any marine craft, large or small. Various forms of lines may be used as hereinafter explained.

The post 2 is provided with an internal bore 7 and enlarged bore 8, providing a shoulder 9 against which a washer or collar 10 on stem 11 may abut when in raised position. The stem 11 carries at its upper end a securing bar or locking plate 12 shaped to complete the streamline or other configuration of the cleat in which mounted.

Recesses 13 and 14 are provided in the body 1 with shoulders 15 and 16, the locking plate 12 resting in the recesses on the shoulders whereby they will be prevented from turning.

Suitable fastening members 17 may be received in countersunk apertures in the body 1 for securing the cleat to the deck, deck house, etc., in any suitable and well-known manner.

In the modified form of my invention shown in Fig. 5, the body 1' is symmetrically curved as shown, rather than streamlined.

In another modification shown in Fig. 6, the cleat is designed for installation in the coaming or bulwark 18 of a craft. The side plates 19 of a body 20 may be fastened to the bulwark by fastening members 21, the post 2 and locking plate 12 being substantially the same as that shown in Figs. 1 to 4, except for a slight difference in contour.

In Fig. 7 the cleat body 22 may be provided with horns 23 where it is necessary that such horns be made available for other than the securing of fender lines, such as mooring lines, etc. The post and locking plate and other details of the cleat are substantially the same as shown in the other forms of the invention.

Fig. 8 shows the invention in use with cleat body 1 secured to the deck 24, the fender 6 on line 5 being positioned between the boat side 25 and the dock 26. In this form the line 5 is shown as being formed of a pair of lines with spaced knots 5' forming loops 5". The line 5a shown in Fig. 9 can be formed from belting material or the like and can be provided with apertures 5b used in the same manner as loops 5". In the form of line shown in Fig. 10, the line 5c is twisted and any suitable type fastener 27 applied at the overlapping intersection of the line to form loops 5d.

In using the cleat, after suitable application to the deck or other location on the craft, when it is desired to place a fender in protective position, the locking plate 12 is raised from shoulders 15 and 16 and out of recesses 13 and 14 and rotated 90° and permitted to drop onto the top of central post 2. In raising the locking plate 12, the washer 10 on stem 11 will strike the shoulder 9 limiting the upward movement of the locking plate and preventing its complete removal and loss. With the locking plate in its transverse, or open position, a loop 5" of the line 5 is dropped over the locking plate and onto central post 2 into aperture 3. In this position it will be most difficult for the line to become accidentally detached from the cleat. However, raising the locking plate 12 and turning it 90° to where it registers with recesses 13 and 14 and permitting it to drop into said recesses will make it impossible for the line 5 to become detached from the cleat. The tying of a fender line to a cleat is entirely eliminated and it is easy to see that changing the position of a fender is a very simple and safe operation eliminating danger to the craft when docking in rough weather since the fender positions can be quickly and easily changed to suit conditions.

From the foregoing it will be seen that I have provided a new and novel cleat for marine craft which will eliminate the danger of accidents caused by the horns of present day cleats; which will make it possible to speed up and simplify the changing of fenders with changing tides and mooring conditions; and which will eliminate the need for unsightly and dangerous loose ends of fender line lying about on the deck.

Obviously, changes in form, proportion and details of construction may be resorted to without departing from the spirit of my invention and I reserve all rights to such changes as come within the scope of these specifications and the claims which follow.

What I claim as new and desire to secure by Letters Patent is:

1. A flush type cleat for mounting in a recess on the coaming or bulwark of a water craft comprising an elongated housing having sides and top flush with the sides and top of the coaming or bulwark, a transverse aperture intermediate the ends and extending between the sides of the housing, an upstanding post in the aperture dividing said aperture into two spaced passages for reception of a line, recesses in the top of the housing adjacent the aperture, a locking plate receivable by the recesses, vertically movable means carried by the locking plate and slidably related to the housing, said locking plate registering with the recesses when in locking position and movable vertically out of the recesses and rotatable into transverse relation to the longitudinal axis of the housing for reception of a line on the post of the cleat.

2. In a horned cleat, a transverse aperture intermediate the ends and extending between the sides of the cleat, an upstanding post in the aperture dividing said aperture into two spaced passages for reception of a line, recesses in the top of the cleat and adjacent the aperture, a locking plate receivable by the recesses, vertically movable means carried by the locking plate and slidably related to the cleat, said locking plate registering with the recesses when in locking position and movable vertically out of the recesses and rotatable into transverse relation to the longitudinal axis of the cleat for reception of a line on the post of the cleat.

3. A line receiving cleat comprising a body member, spaced vertical projections on the body member forming a transverse passage between said projections and from one side of the body member to an opposite side thereof, a vertically extending post in the passage between the vertical projections, for the temporary reception of a removable line, a movable locking member bridging the transverse passage and extending between and engaging the projections when in line locking position, said projections being shaped to prevent rotative movement of the locking member with respect to said projections when said locking member is in line locking position.

4. The structure as specified in claim 3, said post being of less height than the height of the projections, the top of the locking member when said locking member is resting on the post being flush with the top of the projections.

5. The structure as specified in claim 3, said locking member being carried by said post.

6. A line receiving cleat comprising a body member having an elongated streamlined configuration, spaced vertical projections on the body member forming a transverse passage between said projections and from one side of the body member to an opposite side thereof, a vertically extending post in the passage between the vertical projections for the temporary reception of a removable line, a movable locking member bridging the transverse passage and extending between the projections when in line locking position, the upper surface of the locking member being flush with the streamlined contour of the elongated body member when in line locking position.

7. The structure as specified in claim 6, and locking member restraining means in the spaced vertical projections cooperating with the locking member retaining said locking member in line locking position.

8. A cleat comprising a body member, spaced vertical projections on the body member forming a transverse passage between said projections and from one side of the body member to an opposite side of the body member, a vertically extending post in the passage between the vertical projections for the temporary reception of a removable line, a movable locking member bridging the transverse passage and extending between the projections when in locking position, said locking member being pivotally and vertically movable in relation to said post, said locking member and adjacent portions of the cleat including mutually engageable means for preventing rotative movement of said locking member.

9. A cleat comprising a body member, spaced vertical projections on the body member forming a transverse passage between said projections and from one side of the body member to an opposite side of the body member, a vertically extending post in the passage between the vertical projections for the temporary reception of a removable line, a movable locking member bridging the transverse passage and extending between the projections when in locking position, a recess in the top of each projection, the ends of the locking member being receivable in the recesses preventing rotation of the locking member when in locking position.

10. A cleat comprising a body member, spaced vertical projections on the body member forming a transverse passage between said projections and from one side of the body member to an opposite side of the body member, a vertically extending post in the passage between the vertical projections for the temporary reception of a removable line, a movable locking member bridging the transverse passage and extending between the projections when in locking position, said locking member including a central stem, said stem being pivotally and extensibly related to the vertically extending post whereby the locking member may be pivoted to a position transverse to the body member to receive a line for retention by the post.

References Cited in the file of this patent
UNITED STATES PATENTS 410,201     Runyon _____ Sept. 3, 1889

FOREIGN PATENTS 635,569     Germany _____ Sept. 3, 1936